US 6,870,628 B2

United States Patent
Healy et al.

(10) Patent No.: US 6,870,628 B2
(45) Date of Patent: Mar. 22, 2005

(54) ALIGNMENT OF OPTICAL FIBER TO OPTICAL PORT OF INTEGRATED OPTICAL CIRCUIT

(75) Inventors: Alfred Healy, Bedford, MA (US); Donald Scott Gage, West Bridgewater, MA (US)

(73) Assignee: Fibersense Technology Corporation, Canton, MA (US)

( * ) Notice: Subject to any disclaimer, the term of this patent is extended or adjusted under 35 U.S.C. 154(b) by 313 days.

(21) Appl. No.: 10/120,745

(22) Filed: Apr. 11, 2002

(65) Prior Publication Data

US 2003/0020903 A1 Jan. 30, 2003

Related U.S. Application Data

(60) Provisional application No. 60/290,041, filed on May 11, 2001.

(51) Int. Cl.[7] .................................................. G01B 9/02
(52) U.S. Cl. ........................................ 356/477; 356/492
(58) Field of Search .............................. 356/73.1, 153, 356/477, 479, 490, 492, 497, 508

(56) References Cited

U.S. PATENT DOCUMENTS

| 4,750,799 A | | 6/1988 | Kawachi et al. |
| 4,893,931 A | * | 1/1990 | Lefevre et al. ............. 356/479 |
| 5,351,124 A | * | 9/1994 | Laskoskie et al. .......... 356/477 |
| 5,422,713 A | | 6/1995 | Bramson |
| 6,122,936 A | | 9/2000 | Csipkes et al. |

* cited by examiner

Primary Examiner—Samuel A. Turner

(57) ABSTRACT

A method of aligning an optical fiber to an integrated optical circuit includes positioning the optical fiber at a first workstation such that a fast axis of the optical fiber is oriented at a first angular position, and securing the optical fiber to a glass block in that position. Then, positioning the integrated optical circuit at a second workstation such that a fast axis of the integrated optical circuit is oriented at the first angular position, and positioning the glass block and optical fiber at the second workstation with the optical fiber adjacent to the integrated optical circuit, so that the fast axis of the optical fiber is oriented at the first angular position. The free end of the optical fiber is illuminated, and the fiber is rotated until the integrated optical circuit detects a maximum throughput across the interface between the optical fiber and the integrated optical circuit.

50 Claims, 9 Drawing Sheets

ALIGNMENT OF OPTICAL FIBER TO OPTICAL PORT OF INTEGRATED OPTICAL CIRCUIT

CROSS-REFERENCE TO RELATED APPLICATIONS

This application claims the benefit of U.S. Provisional Application No. 60/290,041 entitled "METHOD OF ALIGNING OPTICAL FIBERS TO AN IOC" filed on May 11, 2001, the disclosure of which is entirely incorporated herein by reference.

STATEMENT REGARDING FEDERALLY SPONSORED RESEARCH

Not Applicable

REFERENCE TO MICROFICHE APPENDIX

Not Applicable

BACKGROUND OF THE INVENTION

The inventive concepts in this specification relate to fiber optic gyroscopes (hereinafter referred to as "FOG"), and more particularly, to methods of and devices for matching polarization axes of interconnecting components during the assembly process.

A FOG is used to measure the rate of rotation of a vehicle or other platform to which the FOG is attached. The FOG typically includes a coil of optical fiber disposed about an axis of rotation. Light emanating from a light source is split into two parts (often using an Integrated Optical Circuit; hereinafter "IOC"), and the resulting two parts pass through the optical fiber coil in counter-rotating directions. When the two parts emerge from the fiber coil, they return to the IOC and are recombined therein. A detector measures the recombined sum. Since the light is coherent, the relative phase of the two parts determines the intensity of the recombined sum at the detector. The phase relationship of the two light transmissions is related to the angular rotation of the FOG coil about the axis of rotation, and may be used to derive an output that is indicative of the rate of rotation of the FOG coil.

The coupling of the optical fiber to the IOC is a critical aspect of the FOG assembly. A significant source of error in a FOG system is the inaccurate alignment of the polarization axes of optical fibers to the polarization axes of the integrated optical circuit (IOC). A misalignment of these polarization axes can substantially attenuate the optical signal as it propagates across the fiber to IOC interface. Further, misalignment can result in "cross-talk" from one axis path to the other. This cross-talk from the other axis path effectively acts as a noise component, resulting in a degradation in the signal of interest.

Prior art methods of aligning optical fibers to an IOC involve using a glass block to support the optical fibers during the alignment process. Typically, these methods then involve positioning the glass block on which the optical fiber has been attached in close proximity to the IOC such that the optical axis of the fiber is substantially aligned with the optical axis of the IOC. The method then involves rotating the IOC, and measuring the throughput power as a function of the angle of rotation. The problem with this approach is that the end of the IOC and the end of the block are cut at an angle such that when the block is rotated about the fiber axis, the IOC and the optical fiber are moved out of alignment in other axes, making the endeavor highly iterative and time-consuming, and thus costly. What is needed is a way to speed up the process of aligning optical fibers to an IOC.

The polarization axes of an IOC are orthogonal due to the IOC's crystalline nature. However, the observed polarization axes of optical fibers are not perfectly orthogonal, due to the scattering of light near the end of the fiber. Perfect alignment of the IOC fast axis to the fast axis of the optical fiber is not attempted. The goal in aligning the IOC to the optical fiber is to orient the fiber so that the slow axis of the fiber is orthogonal to the fast axis of the IOC. This process minimizes cross coupling, i.e., the amount of polarized light propagating along the slow axis of the optical fiber that bleeds into the fast axis of the IOC. Slow axis energy bleed-through from the optical fiber to the IOC creates noise in the FOG. This noise, in particular, may be interpreted as an out-of-phase signal and, thus, is an unacceptable error. An IOC is inherently a very good polarizer (+55 dB), and is capable of substantially eliminating energy in the slow axis of the optical fiber. What is needed is an alignment method of optical fibers to an IOC that best utilizes the polarizing capability of the IOC.

SUMMARY OF THE INVENTION

A method of aligning an optical fiber to an optical port of an integrated optical circuit, so as to maximize power throughput across an interface between the optical fiber and the integrated optical circuit, includes positioning the optical fiber at a first workstation such that a polarization axis of the optical fiber is oriented at a first angular position with respect to a first reference surface, and securing the optical fiber to a glass block while the fast axis of the optical fiber is oriented at the first angular position with respect to the first reference surface. In one preferred embodiment, the polarization axis includes the fast axis of the fiber. In another embodiment, the polarization axis includes the slow axis of the fiber. The method further includes positioning the integrated optical circuit at a second workstation such that a fast axis of the integrated optical circuit is oriented at the first angular position with respect to a second reference surface. The method also includes positioning the glass block with the optical fiber at the second workstation such that a first end of the optical fiber is adjacent to the optical port of the integrated optical circuit, and the fast axis of the optical fiber is oriented at the first angular position with respect to the second reference surface. The method also includes illuminating a second end of the optical fiber at the second workstation, and rotating the optical fiber about the longitudinal axis of the optical fiber until the integrated optical circuit detects a maximum light power throughput across the interface between the optical fiber and the integrated optical circuit.

In another embodiment, the method further includes positioning a birefringent component on the first workstation such that a fast axis of the birefringent component is oriented at the first angular position with respect to the reference surface. The method also includes positioning a light source at second end of the optical fiber, and positioning the optical fiber such that the first end of the optical fiber directs a light beam through a first end of the birefringent component. The method further includes positioning an interferometer at a second end of the birefringent component so as to receive the light beam. The interferometer is configured to provide an optical path difference corresponding to a delay difference between a fast axis path and a slow axis path through the birefringent component. The method also includes rotating the optical fiber about the longitudinal axis of the optical fiber until the interferometer produces a minimum detector signal.

In another embodiment, the birefringent component includes a calcite crystal.

In another embodiment, the method further includes securing the birefringent component to a holder component.

In another embodiment, the method further includes aligning the holder component at the first workstation via an autocollimator, so that the holder components maintains the birefringent component with the fast axis of the birefringent component oriented at the first angular position with respect to the first reference surface.

In another embodiment, the holder component includes an adjusting mechanism for adjusting the position of the holder component with respect to the first reference surface.

In another embodiment, the method further includes aligning the glass block at the first workstation via an autocollimator, so that the top surface of the glass block is parallel to the first reference surface.

In another embodiment, the method further includes securing the glass block in a block holder component.

In another embodiment, the block holder component includes an adjusting mechanism for adjusting the position of the block holder component with respect to the first reference surface.

In another embodiment, the method further includes orienting the optical fiber such that the fast axis of the optical fiber is perpendicular to the first reference surface.

In another embodiment, the method further includes applying an adhesive to the optical fiber and the glass block, so as to secure the optical fiber to the glass block.

In another embodiment, the method further includes applying an epoxy to the optical fiber and the glass block, so as to secure the optical fiber to the glass block.

In another embodiment, the method further includes aligning the integrated optical circuit at the second workstation via an autocollimator, so that the top surface of the integrated optical circuit is parallel to the second reference surface.

In another embodiment, the method further includes aligning the glass block at the second workstation via an autocollimator, so that the top surface of the glass block is parallel to the second reference surface.

In another embodiment, the method further includes fixedly attaching the optical fiber to the integrated optical circuit after aligning the optical fiber to the integrated optical circuit.

In another embodiment, the method further includes applying an adhesive to the optical fiber and the integrated optical circuit, so as to fixedly attach the optical fiber to the integrated optical circuit.

In another embodiment, the method further includes applying an epoxy to the optical fiber and the integrated optical circuit, so as to fixedly attach the optical fiber to the integrated optical circuit.

A method of aligning an optical fiber to an optical port of an integrated optical circuit, so as to maximize the power throughput across an interface between the optical fiber and the integrated optical circuit, includes positioning the optical fiber at a first workstation such that a slow axis of the optical fiber is oriented at a first angular position with respect to a first reference surface, and securing the optical fiber to a glass block while the slow axis of the optical fiber is oriented at the first angular position with respect to the first reference surface. The method also includes positioning the integrated optical circuit at a second workstation such that a slow axis of the integrated optical circuit is oriented at the first angular position with respect to a second reference surface. The method further includes positioning the glass block with the optical fiber at the second workstation such that a first end of the optical fiber is adjacent to the optical port of the integrated optical circuit and the slow axis of the optical fiber is oriented at the first angular position with respect to the second reference surface. The method also includes illuminating a second end of the optical fiber at the second workstation, and rotating the optical fiber about a longitudinal axis of the optical fiber until the integrated optical circuit detects a maximum light power throughput across the interface between the optical fiber and the integrated optical circuit.

A system for aligning an optical fiber to an optical port of an integrated circuit, so as to maximize power throughput across an interface between the optical fiber and the integrated optical circuit, includes a first workstation, for positioning the optical fiber such that a fast axis of the optical fiber is oriented at a first angular position with respect to a first reference surface. The first workstation is also used to secure the optical fiber to a glass block while the fast axis of the optical fiber is oriented at the first angular position with respect to the first reference surface. The system also includes a second workstation for positioning the integrated optical circuit such that a fast axis of the integrated optical circuit is oriented at the first angular position with respect to a second reference surface. The glass block with the optical fiber is transferred from the first workstation to the second workstation such that a first end of the optical fiber is adjacent to the optical port of the integrated optical circuit, and the fast axis of the optical fiber is oriented at the first angular position with respect to the second reference surface. While the second end of the optical fiber is illuminated, the optical fiber is rotated about a longitudinal axis of the optical fiber until the integrated optical circuit detects a maximum light power throughput across the interface between the optical fiber and the integrated optical circuit.

In another embodiment of the invention, the system further includes a glass block holder, adjustably attached to the first reference surface, for holding the glass block at the first angular position with respect to the first reference surface.

In another embodiment of the invention, the first workstation of the system the first reference surface, the glass block, adjustably attached to the first reference surface, and a birefringent component, adjustably attached to the first reference surface, for receiving a light beam emanating from the optical fiber. The first workstation further includes an interferometer, fixedly attached to the first reference surface, for receiving the light beam that traverses and emanates from the birefringent component.

In another embodiment of the invention, the system further includes an autocollimator for determining a position of the glass block and a position of the birefringent component, each with respect to the first reference surface.

In another embodiment of the invention, the system further includes a birefringent component holder for holding the birefringent component at the first angular position with respect to the first reference surface.

In another embodiment of the invention, the the birefringent component holder includes an adjusting mechanism for varying a position of the birefringent component holder with respect to the first reference surface. In one embodiment, the adjusting mechanism includes a shim disposed between the birefringent component holder and the first reference surface.

In another embodiment of the invention, the birefringent component includes a calcite crystal.

In another embodiment of the invention, the system further includes a glass block holder for holding the glass block at the first angular position with respect to the first reference surface.

In another embodiment of the invention, the system further includes an adjusting mechanism for varying a position of the glass block holder with respect to the first reference surface. In one embodiment of the invention, the adjusting mechanism includes a micrometer screw.

In another embodiment of the invention, the interferometer is configured to provide an optical path difference corresponding to a delay difference between a fast axis path and a slow axis path through the birefringent component.

In another embodiment of the invention, the the interferometer is configured to produce a minimum output signal when the fast axis of the optical fiber is aligned with the fast axis of the birefringent component.

In another embodiment of the invention, the second workstation of the system the second reference surface, and an integrated optical circuit removably attached to the second reference circuit. The second workstation also includes an additional glass block holder, adjustably attached to the second reference surface, for holding the glass block such that (i) the first end of the optical fiber is adjacent to the optical port of the integrated optical circuit, and (ii) the fast axis of the optical fiber is oriented at the first angular position with respect to the second reference surface.

In another embodiment of the invention, the additional glass block holder includes a micrometer screw for varying a position of the glass block holder with respect to the second reference surface.

In another embodiment of the invention, the additional glass block holder includes a clamp for removably securing the glass block.

In another embodiment of the invention, the system further includes an integrated optical circuit stage for supporting the integrated optical circuit, wherein the integrated optical circuit stage is adjustably attached to the reference surface so as to selectably vary a position of the integrated optical surface.

A system for aligning an optical fiber to an optical port of an integrated circuit, so as to maximize power throughput across an interface between the optical fiber and the integrated optical circuit, includes a first workstation for positioning the optical fiber such that a polarization axis of the optical fiber is oriented at a first angular position with respect to a first reference surface, and for securing the optical fiber to a glass block while the fast axis of the optical fiber is oriented at the first angular position with respect to the first reference surface. The system further includes a second workstation for positioning the integrated optical circuit such that a polarization axis of the integrated optical circuit is oriented at the first angular position with respect to a second reference surface. The glass block with the optical fiber is transferred from the first workstation to the second workstation such that a first end of the optical fiber is adjacent to the optical port of the integrated optical circuit and the polarization axis of the optical fiber is oriented at the first angular position with respect to the second reference surface, and while the second end of the optical fiber is illuminated, the optical fiber is rotated about a longitudinal axis of the optical fiber until the integrated optical circuit detects a maximum light power throughput across the interface between the optical fiber and the integrated optical circuit.

In another embodiment, the polarization axis includes a fast axis. In yet another embodiment, the polarization axis includes a slow axis.

BRIEF DESCRIPTION OF DRAWINGS

The foregoing and other objects, the various unique features, as well as various inventive embodiments, may be more fully understood from the following description, when read together with the accompanying drawings in which.

The drawings depict preferred embodiments of the present invention by way of example, not by way of limitations. In the drawings, like reference numerals refer to the same or similar elements.

DESCRIPTION OF THE PREFERRED EMBODIMENTS

The embodiments described herein entail three related procedures. The first procedure is a method of calibrating two different workstations to a common frame of reference, so that components associated with those workstations can be transferred between the workstations with constant, known orientations. This procedure is referred to herein as "system alignment." Second, the embodiments provide a subsequent method of using one of the calibrated workstations to achieve a known alignment of the polarization axes of an optical fiber with respect to the common frame of reference. The third technique is a method of using the other calibrated workstation to optimally align the polarization axes of the optical fiber to the corresponding polarization axes of an integrated optical circuit (referred to herein as "IOC"), and of securing the optical fiber to the IOC while they are optimally aligned. These procedures, referred to herein as "transferring alignment," are useful in that they distribute the overall procedure of coupling the fiber to the IOC between two separate workstations, so that two assembly procedures can be accomplished in parallel, thereby increasing efficiency. Further, distributing the overall procedure between two separate workstations allows each workstation to be a more manageable size, with respect to a single workstation designed to perform the overall procedure.

Figure 3A:
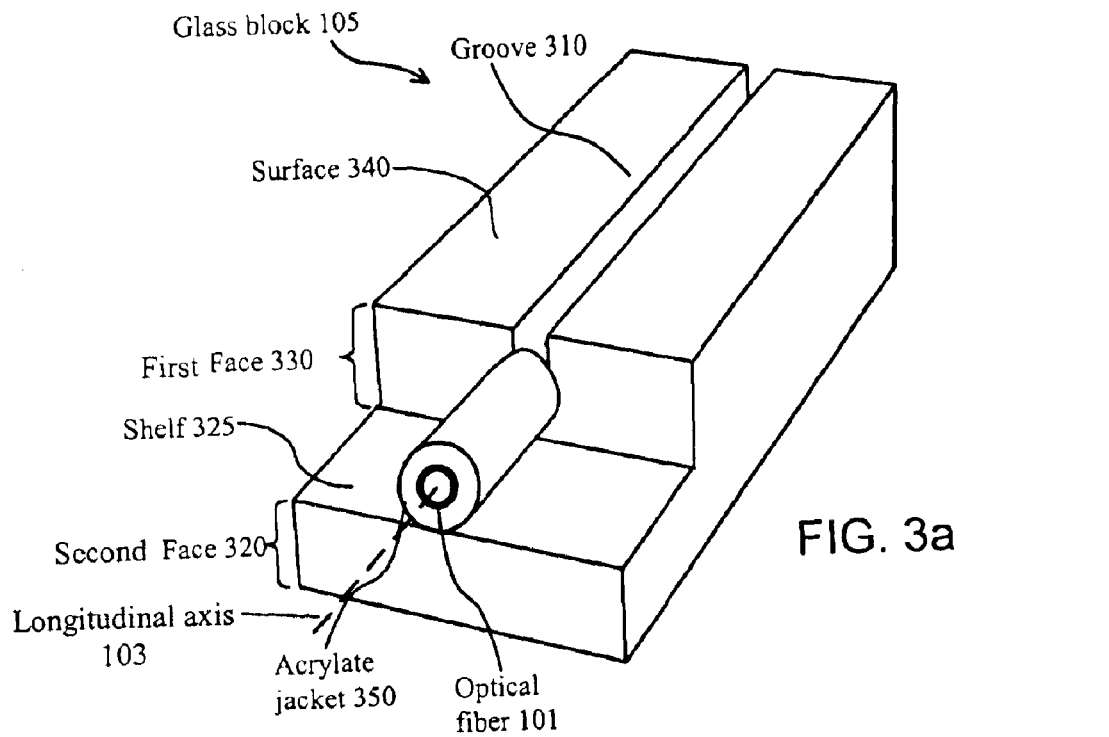
FIG. 3a shows the glass block of FIG. 1 in perspective view.
Figure 3B:
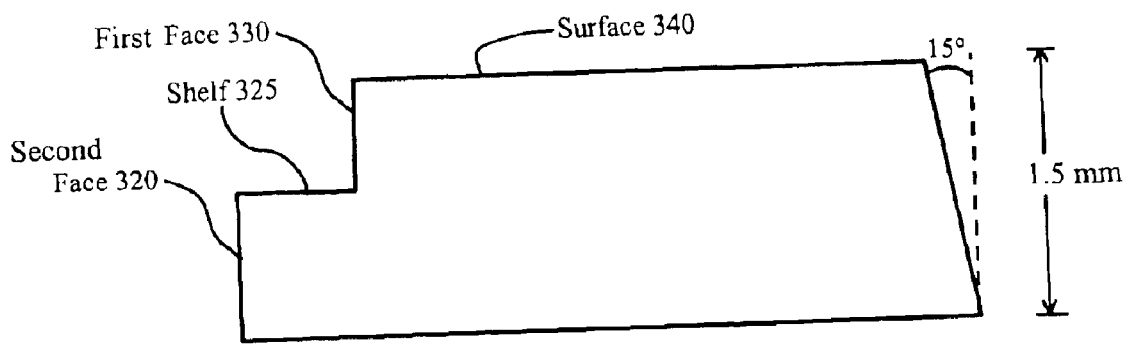
FIG. 3b shows the glass block of FIG. 1 in side-view.
Figure 4:
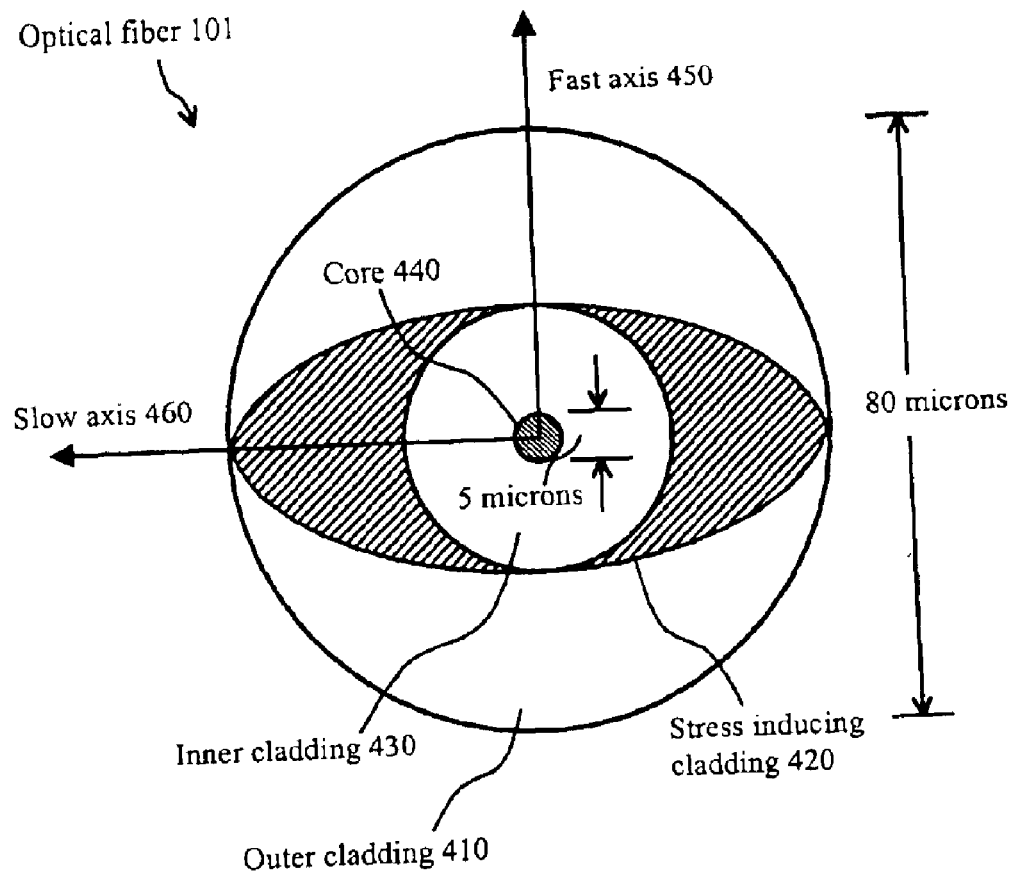
FIG. 4 shows a cross-sectional view of the optical fiber from FIG. 1.
Figure 5:
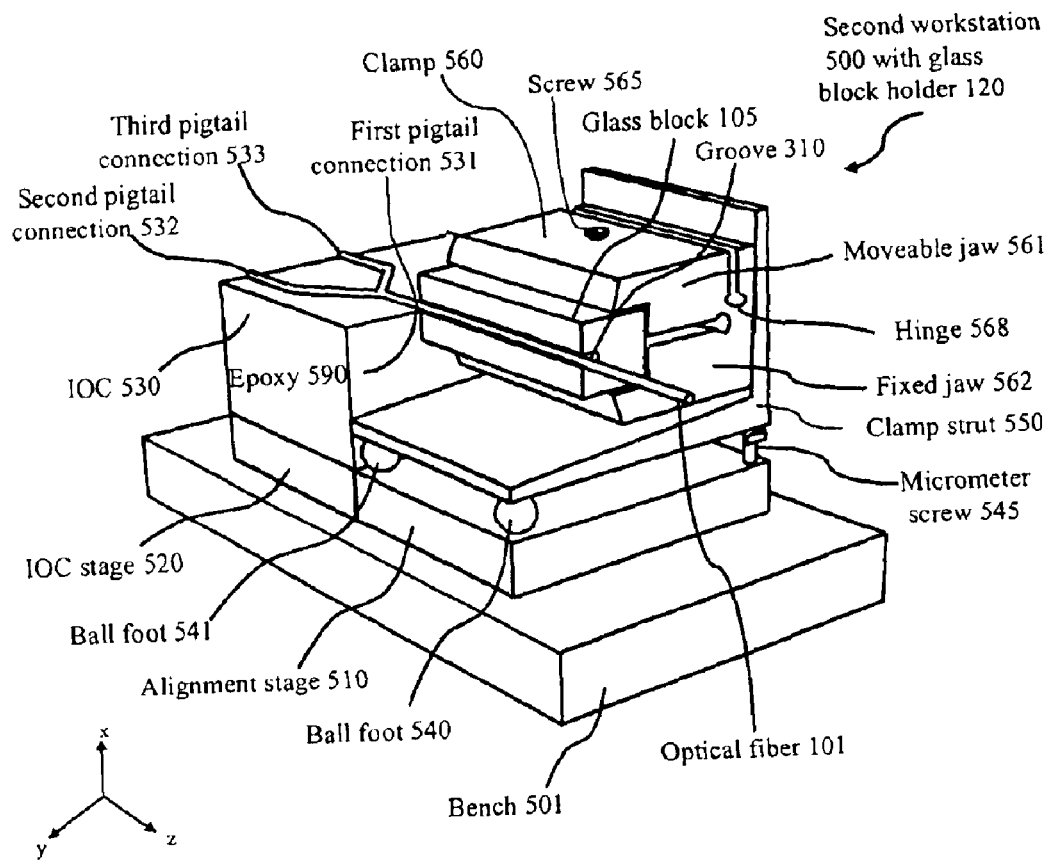
FIG. 5 shows the components of one embodiment of a workstation for aligning an optical fiber to an IOC.
Figure 6:
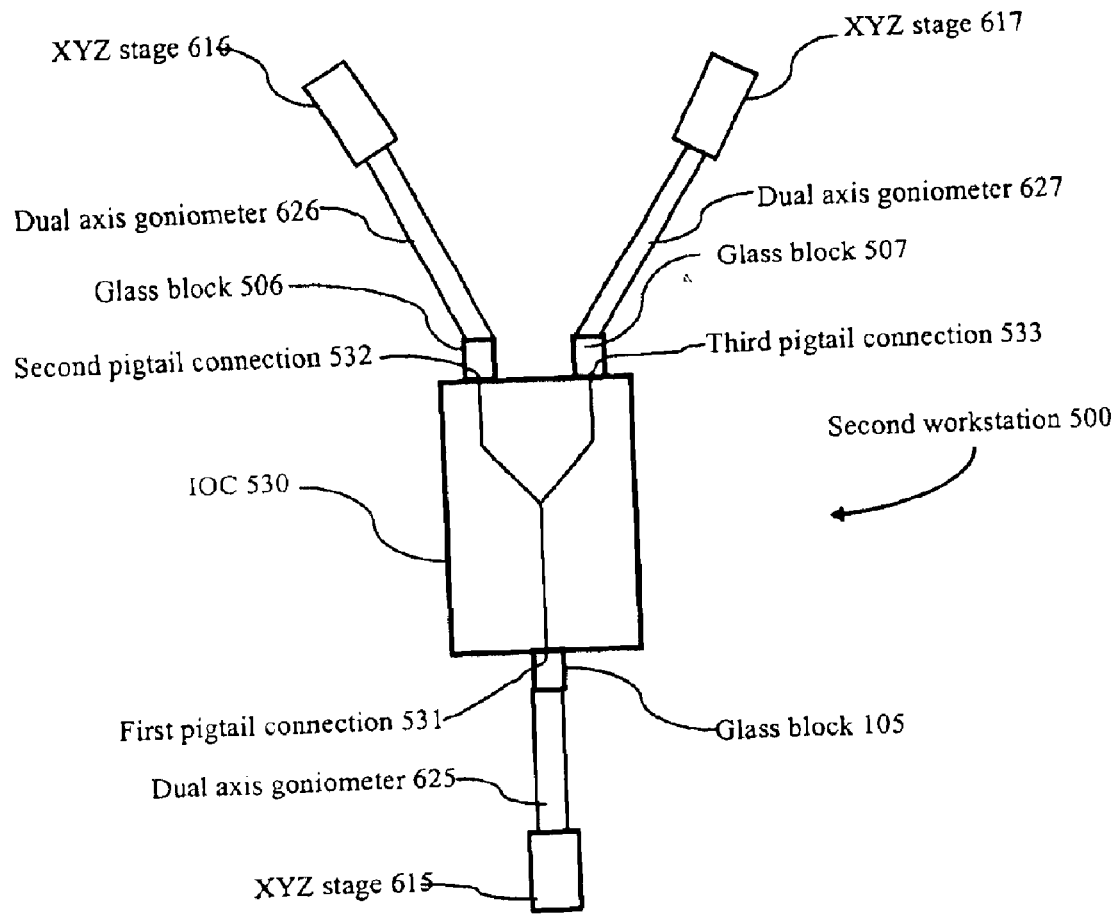
FIG. 6 illustrates an alternate embodiment of the workstation shown in FIG. 5.
Figure 7:
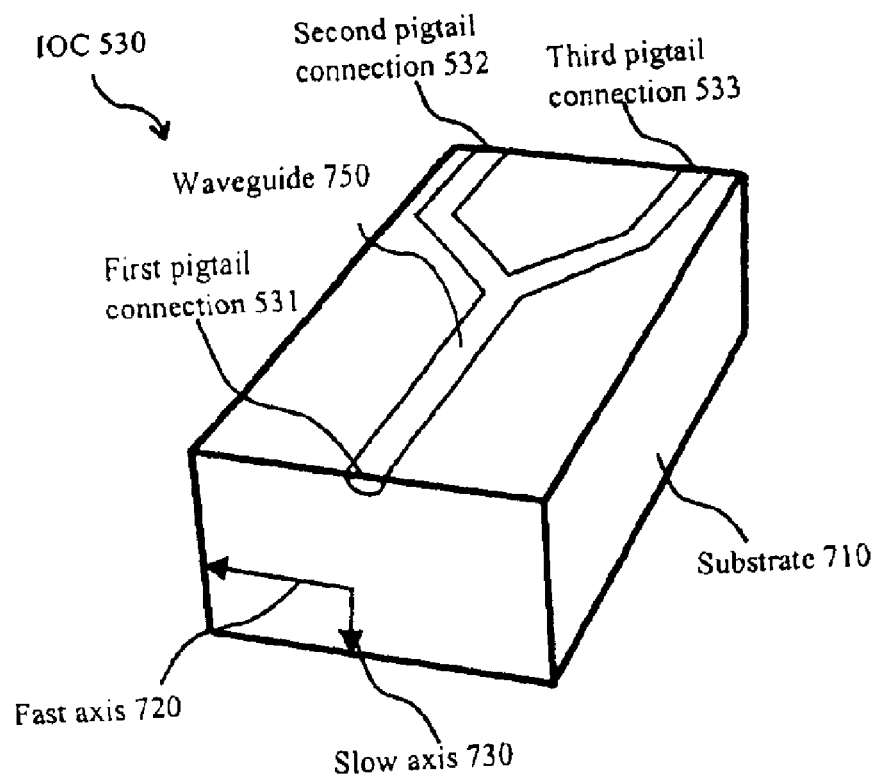
FIG. 7 shows a detailed view of the IOC from FIG. 5.
Figure 8:
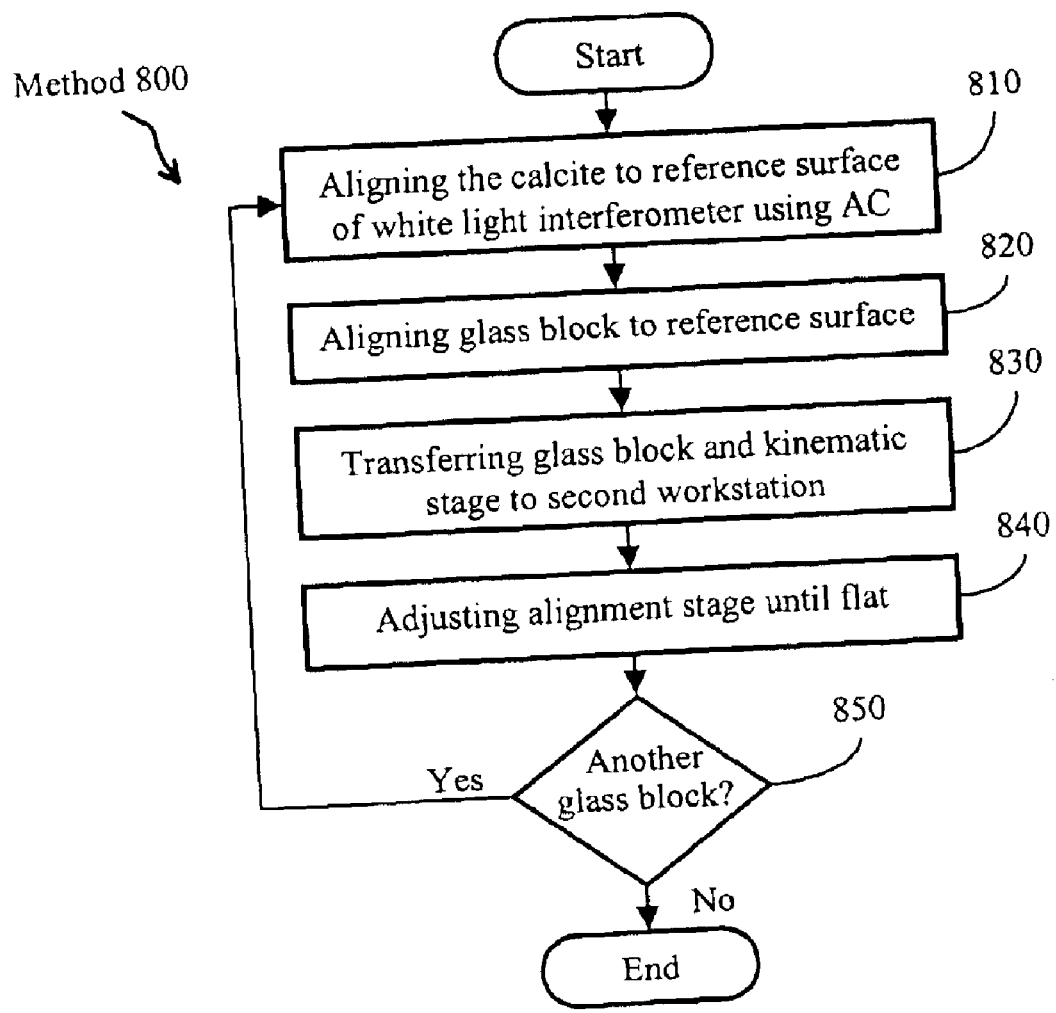
FIG. 8 shows a flow diagram depicting a method of aligning an optical fiber to an IOC; and, FIG. 9 shows a flow diagram depicting a method of transferring an aligned optical fiber.
Figure 9:
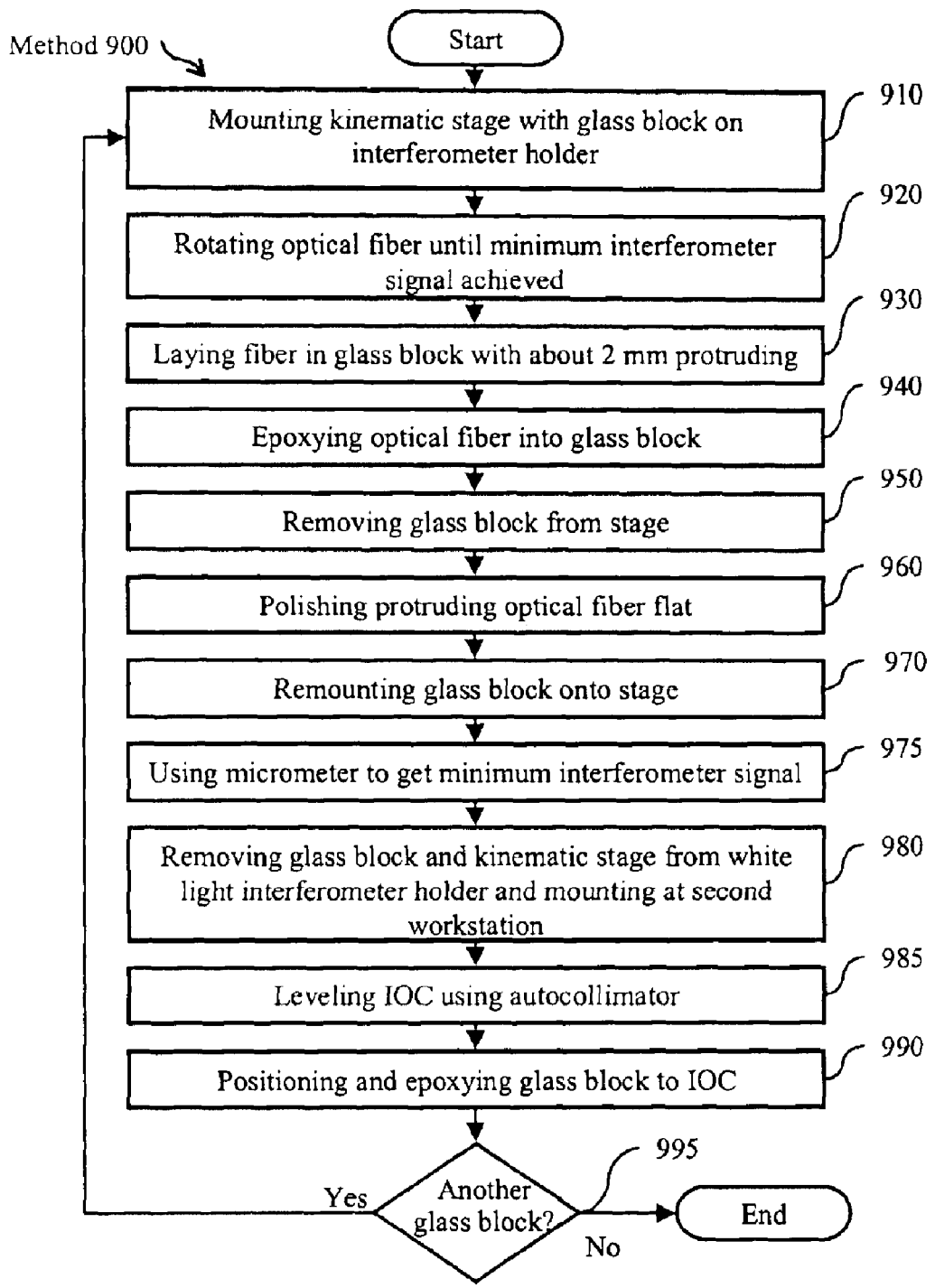

FIGS. 1 through 4 depict components associated with one preferred embodiment of the first workstation, while FIGS. 5 through 7 depict components associated with two embodiments of the second workstation. FIG. 8 and FIG. 9 present flowcharts of the method steps associated with one preferred embodiment of the present invention.

Figure 1:
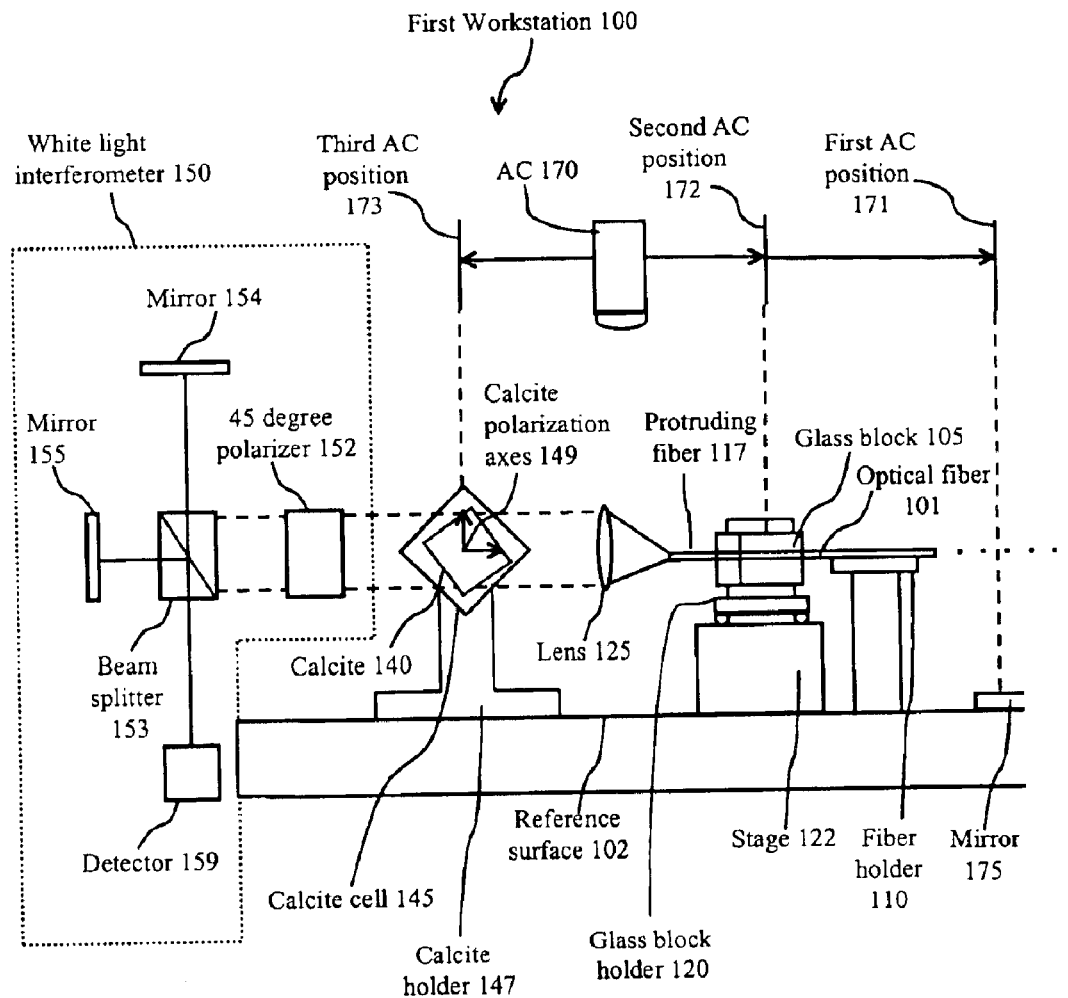
FIG. 1 shows the components of one embodiment of a workstation for establishing polarization axes alignment of an optical fiber with respect to a fixed frame of reference.
Figure 2:
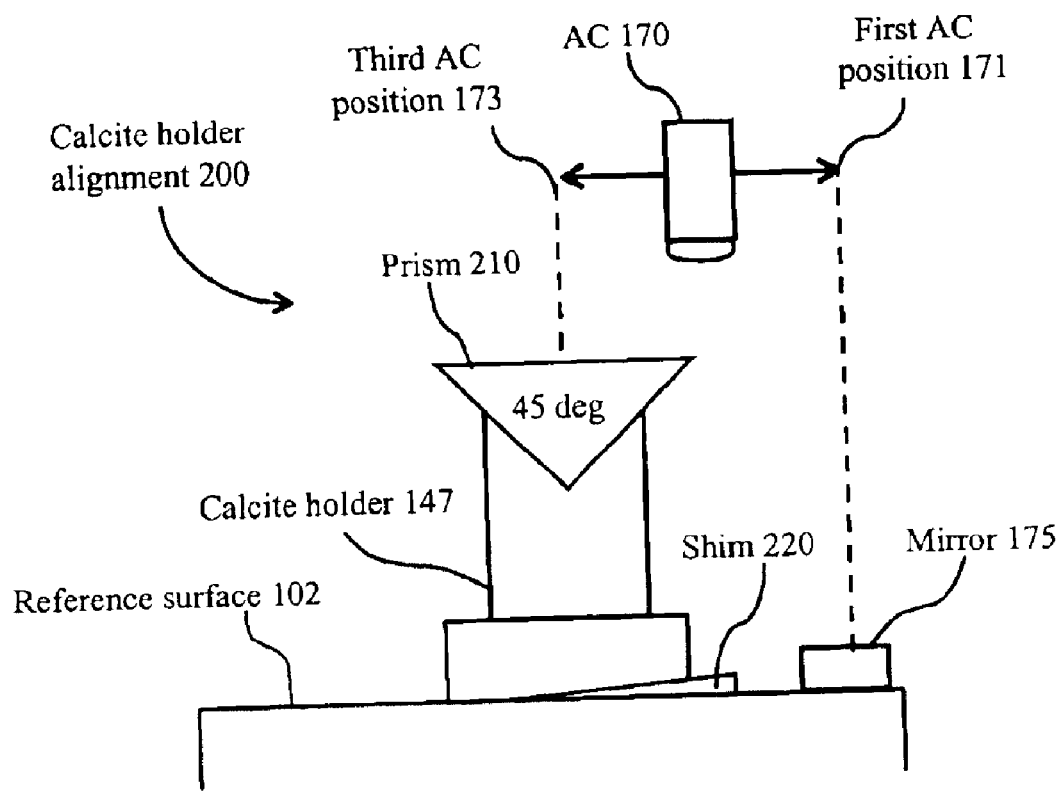
FIG. 2 shows components used to align the calcite holder from the workstation of FIG. 1.

FIG. 1 shows the components of one embodiment of a first workstation 100 for establishing a known alignment of the polarization axes of an optical fiber 101 with respect to a fixed frame of reference, according to the present invention. The components in FIG. 1 are shown conceptually only, and are not necessarily drawn to scale. The first workstation 100 includes a reference surface 102, a fiber holder 110, an optical fiber 101 (a portion of which is referred to herein as a "protruding fiber 117"), a lens 125, a stage 122, a glass block holder 120 and a glass block 105. The first workstation 100 further includes a calcite crystal 140 (characterized by two calcite polarization axes 149), a calcite cell 145, a calcite holder 147, an autocollimator 170 (also referred to herein as AC), and a white light interferometer 150.

Optical fiber 101 is a single-mode, polarization-maintaining optical fiber that includes claddings, a core, a fast axis, and a slow axis. Optical fiber 101 is described in more detail herein, in conjunction with FIG. 4.

Reference surface 102 is preferably an optical bench that supports the various components of the first workstation 100, and provides a fixed reference plane from which to measure relative positions and angles of the various components of the first workstation 100. Other embodiments of the invention may use similar suitable surfaces to provide a fixed reference plane; for example, a block of aluminum, steel, composite, or other rigid material may be custom-drilled to provide the mounting sites necessary to attach the aforementioned components.

The fiber holder 110 is a rotation stage to which optical fiber 101 is attached, and is commercially available from optical suppliers such as Newport Research Corp. The optical fiber 101 extends beyond the fiber holder 110, as shown by the dotted line, to a light source (a super luminescent diode "SLD," not shown). The glass block 105 supports and accommodates rotation of optical fiber 101. Glass block 105 is described in more detail herein, in conjunction with FIG. 3. The protruding fiber 117 is an end of optical fiber 101 that protrudes approximately two millimeters out of glass block 105. The length of this protrusion is shown exaggerated in FIG. 1 for clarity. The glass block holder 120 is a support for glass block 105, and is described in more detail herein, in conjunction with FIG. 5. The stage 122 is an adjustable mounting apparatus that supports glass block holder 120 and facilitates the positioning of glass block 105. The lens 125 is a commercially available optical component serving to collimate the light that traverses it. The lens 125 is positioned perpendicular to a longitudinal axis of the fiber 101, via a mounting bracket (not shown), so that light emitted from the protruding fiber 117 passes through the lens 125.

The calcite crystal 140 is a birefringent material, characterized by crystalline axes that provide both a fast axis and a slow axis for the propagation of light. In other embodiments of the invention, other birefringent components may be used in place of the calcite crystal 140, as long as the birefringent component includes a fast axis and a slow axis that are orthogonal or nearly orthogonal to one another. Light polarized parallel to the fast axis propagates faster than light polarized parallel to the slow axis. Furthermore, these calcite polarization axes 149 are exactly orthogonal. Calcite cell 145 is a mounting apparatus that securely holds calcite crystal 140. Calcite holder 147 supports calcite cell 145 above stage 122 in an orientation that allows light propagating through lens 125 to pass through the calcite crystal 140 and into the white light interferometer 150 as shown in FIG. 1. The calcite holder 147 includes a 45 degree notch, preferably 22.5 degrees on either side of the vertical with respect to the reference surface. This angle ensures that the fast and slow axes of the calcite crystal 140 will be either perpendicular or parallel to the reference surface when the calcite crystal is mounted in the holder 147.

White light interferometer 150 is an instrument used to indicate the relative alignment of the polarization axes of optical fiber 101 and the calcite polarization axes 149. White light interferometer 150 includes a 45-degree polarizer 152, a beam splitter 153, a long path mirror 154, a short path mirror 155, and a detector 159 arranged as shown in FIG. 6. The long path mirror 154 and the short path mirror 155 are light-reflecting surfaces available commercially from optical suppliers such as Melles-Griot. The positions of the mirrors 154 and 155 can be adjusted in order to vary the optical path difference that the interferometer 150 introduces. The beam splitter 153 is a 50—50 beam splitter that equally divides light signals passing through it, and directs half of the light to the long path mirror 154 and half of the light to the short path mirror 155. Such beam splitters may be acquired commercially from optical suppliers such as Melles-Griot. The detector 159 is opto-electric component that produces an electric signal at its output, the characteristics of which vary as a function of the magnitude of the light signals incident upon it. Electronic elements (not shown) receive the output signal from the detector 159 and interpret the variations in the electrical signal.

AC 170 is a movable instrument that measures the angle of a surface, relative to a reference plane internal to AC 170. AC 170 thus allows an operator to visually align a surface to a desired orientation. AC 170 is used to align several elements in both first workstation 100 and the second workstation. AC 170 is shown in FIG. 1 with three possible positions: a first AC position 171, a second AC position 172, and a third AC position 173. A plane parallel mirror 175 is attached to or otherwise placed on the reference surface 102, such that the reflecting surface of the plane parallel mirror 175 is parallel to the reference surface 102. A Sarrett gage block works well as the mirror 175, although other similar planar reflecting surface may also be used. First AC position 171 is used to establish the internal AC reference plane, relative to reference surface 102. During the calibration procedure (after the AC reference is established), AC 170 moves between second AC position 172, above glass block 105, and third AC position 173, above calcite crystal 140, as is described in more detail herein.

System Alignment

In operation, first workstation 100 is preferably calibrated as follows: AC 170 is moved to position 171 and the AC 170 establishes an internal reference via mirror 175. Next, AC 170 is used to align calcite holder 147 to reference surface 102 in front of the white light interferometer 150, as shown in more detail in FIG. 2. The components used to align the calcite holder, shown in FIG. 2, include a 45 degree right prism 210, a shim 220, and the mirror 175. The 45 degree right prism 210 is a conventional optical component available commercially from suppliers such as Melles-Griot. Shim 220 is a wedge-like component, placed between the calcite holder 147 and the reference surface 102. The shim is longitudinally translated along the reference surface 102 so as to vary the angle between the bottom of the calcite holder and the reference surface 102, thereby adjusting the orientation of calcite holder 147. Although the shim 220 is shown on the right side of the calcite holder 147 in FIG. 2, the shim 220 could be located on the left side of the holder 147 in other embodiments. A locking mechanism (not shown) may be included to maintain the position of the shim 220 once the desired position of the calcite holder has been established. Alternate mechanisms known in the art may be used to adjust the orientation of the calcite holder 147 in other embodiments. For example, a micrometer screw, attached to the calcite holder 147, may be adjusted to raise or lower one side of the calcite holder 147 with respect to the reference surface 102, while the other side of the calcite holder 147 is held fixed. To align the calcite holder, an operator reads AC 170 to measure the angle between the top surface of prism 210 and an imaginary axis perpendicular to the reference surface 102. The prism 210 is then rotated 180 degrees in the plane of its top surface and the operator takes a second measurement via AC 170. The result of the second measurement will be opposite in sign with respect to the first measurement. If the magnitudes of the angles are not equal, the shim 220 is adjusted so as to change the orientation of the calcite holder 147, and the two measurements are retaken. The shim adjustment and subsequent angle measurements are repeated until the magnitudes of the angles are equal, at which point the calcite holder 147 is properly aligned. The two measurements (i.e., with the prism 210 rotated by 180 degrees) are taken to remove the effects of imperfections in the prism 210. If the prism 210 is a perfect 45 degree right prism, the two angular measurements will be exactly 90 degrees, i.e., the top surface of the prism 210 will be exactly parallel to the reference surface 102.

Once the calcite holder is properly aligned, the light source is illuminated so that light passes through the fiber 101, past the calcite holder 147 and into the interferometer 150. The components are adjusted for a maximum detector 159 output (i.e., a maximum value of the electrical signal from the detector 159) with the fiber 101 aligned in all axes, except fiber rotation, with the interferometer 150 set for 0 optical path difference (OPD). The calcite crystal 140 is then temporarily mounted in the calcite holder 147, preferably with wax, although other suitable temporary adhesives known in the art may also be used to secure the crystal 140. With the calcite crystal 140 in the light beam path, the fiber is rotated until the electrical signal at the output of the detector 159 reaches a minimum value. The calcite crystal 140 is then rotated within its cell 145 into different positions. For each position of the crystal 140, the calcite crystal 140 is rotated 180 degrees about the vertical axis (i.e., the axis perpendicular to the reference surface 102), and the detector output is observed at the 0 degree position (i.e., the initial position) and the 180 degree position. This procedure is iterated until a position of the crystal 140 is found for which the minimum detector 159 output is substantially equal at 0 degrees and 180 degrees. Once this position is found, the calcite crystal 140 is permanently affixed to the cell 145, preferably with epoxy, although other methods of permanently securing the crystal may also be used in other embodiments of the invention.

After the crystal 140 has been permanently secured, AC 170 is moved to position 172 and is used to determine the position of the top surface of glass block 105 with respect to the reference surface 102. A micrometer screw (not shown) attached to the glass block holder 120 is used to move the glass block holder 120 with respect to the reference surface 102 (see FIG. 5 for a more detailed view of the glass block holder 120 in the second workstation 500). The micrometer screw is adjusted until the AC 170 indicates that the top surface of the glass block holder 120 is parallel to the reference surface 102. In one embodiment, a Sarrett gage block is used to provide a reflective surface on the top surface of the glass block holder 120, although other similar planar reflecting surfaces may also be used. Such a gage block is used because the reflectivity of glass is approximately 4 percent, while a metal mirror can provide reflectivity of greater than 80 percent.

Additional system alignment is described herein for the second workstation.

Transferring Alignment

During the procedure of transferring alignment, first workstation 100 is used as follows: the SLD illuminates optical fiber 101 from the end not shown (depicted in FIG. 1 by a dotted line). Optical fiber 101 is held by fiber holder 110 and is aligned with the optical axis of lens 125. Lens 125 collimates light emitted from protruding fiber 117. The collimated light traverses the crystal of calcite crystal 140. As light propagating along the fast axis of optical fiber 101 subsequently traverses the crystal of calcite crystal 140, a portion of the light is aligned with the fast axis of calcite crystal 140, and a first wavefront emerges. The portion of light aligned with the crystal fast axis depends on the orientation of the fast axis of optical fiber 101 with respect to the fast axis of calcite crystal 140, and can be as little as 0 percent to as much as 100 percent. A second wavefront, orthogonal to the first wavefront, also emerges from calcite crystal 140, but is delayed in time with respect to the first wavefront. The first wavefront and the second wavefront both emerge from calcite crystal 140 as collinear, but non-interfering orthogonal functions, and enter white light interferometer 150. The mirrors within the interferometer 150 are configured so that the OPD of the interferometer corresponds to the delay difference between the fast axis and the slow axis of the calcite crystal 140. The first and second orthogonal, non-interfering waveforms traverse 45-degree polarizer 152. After traversing the polarizer 152, the two wavefronts have the same polarization, so that interference is possible. When the two wavefronts now enter beam splitter 153, a first portion of the two wavefronts passes through beam splitter 153, reflects off mirror 155, and propagates back to beam splitter 153. Beam splitter 153 then deflects the first portion of the two wavefronts into detector 159. The remaining portion of the two wavefronts reflects off the internal surface of beam splitter 153, and then reflects off mirror 154 before passing entirely through beam splitter 153 and striking detector 159, where the remaining portion of the two wavefronts mixes with the first portion of the two wavefronts.

Light propagating through optical fiber 101, and subsequently through calcite crystal 140 and white light interferometer 150 of first workstation 100, is emitted from an SLD of limited coherence length. This coherence length is sufficiently long that, as a minimum, a few interference fringes are observable by an operator (i.e., a person performing the fiber alignment). The coherence length is sufficiently short that the wavefronts of the fast and slow axes do not interfere with each other in their calcite crystal 140-displaced positions. Since the optical path difference between the fast and slow axes of the calcite crystal 140 is matched by the optical path difference of the interferometer 150, the fast axis wavefront from calcite crystal 140 is retarded in the longer leg of the interferometer 150. The optical path length of the fast axis wavefront from the input of the crystal 140 to the detector 159 is thus substantially equal to the optical path length of the slow axis wavefront from the input of the crystal 140 to the detector 159.

Detector 159 generates an electric signal corresponding to the mixed wavefronts, which is used to optimize the orientation of optical fiber 101.

To orient the fast and slow axes of the optical fiber 101 to the corresponding axes of the calcite crystal 140, the optical fiber 101 is rotated about its longitudinal axis 103, using the fiber holder 110, until the electric signal from the detector 159 reaches a minimum. In general, this step orients a polarization axis (e.g., the fast axis, the slow axis, etc.) of the fiber at an angular position with respect to the reference surface 102. This is true because during the system alignment, all components of the first workstation 100 are oriented with respect to the reference surface 102. The optical fiber 101 is then situated into a groove in the surface of glass block 105 (see FIG. 3) with approximately 2 millimeters protruding, and the optical fiber is fixedly attached the glass block. The optical fiber 101 is preferably secured with epoxy, although other suitable adhesives known in the art may also be used. Glass block 105 is then detached from glass block holder 120, and protruding fiber 117 portion of optical fiber 101 is polished flat. Glass block 105 is remounted onto glass block holder 120. The micrometer screw (see FIG. 5) at the base of the glass block holder 120 is then adjusted to regain a minimum white light interferometer 150 signal. This re-adjustment to regain a minimum electric signal from the detector is necessary because the fiber 101 can be accidentally moved while securing it to the glass block 105, or while polishing away the protruding fiber. Typically only a small adjustment, if any, is necessary. The glass block 105, along with the final micrometer screw setting, are removed from glass block holder 120 and mounted on a clamp at the second workstation (also referred to as the "pigtailing station").

FIGS. 3a and 3b show glass block 105 in perspective and side-view, respectively. Glass block 105 includes a groove 310, a first face 320, a second face 330, a top surface 340, and a shelf 325. FIG. 3a further shows optical fiber 101 disposed within groove 310 and an acrylate jacket 350.

The glass block 105, as shown in FIGS. 3a and 3b, is fabricated from any of several glass types, using conventional techniques known to those in the art. The preferable dimensions of glass block 105 are approximately 2 mm by 1½ mm by 1½ mm, although variations to these dimensions may be made without altering the essence of the invention. Groove 310 is formed in surface 340 of glass block 105, as shown in FIG. 3a. Glass block 105 also has surfaces first face 320, shelf 325, and second face 330 disposed in glass block 105 to form an indentation in glass block 105. First face 320 is at a right angle below shelf 325, and second face 330 is at a right angle above shelf 325.

The acrylate jacket 350 is a protective coating surrounding optical fiber 101 that enables clean handling of optical fiber 101 and further lends additional protection to optical fiber 101. To prepare the optical fiber to be mounted on the glass block 105, a portion of acrylate jacket 350 is removed from optical fiber 101, e.g., using ajacket stripper. Glass block 105 is then positioned around the stripped portion of optical fiber 101 such that 1–2 mm of optical fiber 101 is protruding. The glass block 105 is designed such that a pair of blocks can hold a pair of fibers 400 microns (0.015 inches) center to center when the pair of blocks are arranged with their surfaces 340 face-to-face. Thus, the shelf 325 is about 180 microns (0.0075 inches) deep. The groove 310 is deep enough so that the fiber does not rest on the bottom of groove 310 when the acrylate jacket 350 is resting on shelf 325. The angled end (15 degrees in FIG. 3b) of the block 105 and protruding fiber 117 are polished. The companion block of a pair has the angle reversed.

FIG. 4 shows a cross-sectional view of polarization-maintaining optical fiber 101, including an outer cladding 410, a stress inducing cladding 420, an inner cladding 430, a core 440, a fast axis 450, and a slow axis 460. Acrylate jacket 350 is not shown.

The exemplary optical fiber 101 in FIG. 4 is approximately 80 microns in diameter and core 440 is preferably approximately five microns in diameter, although the concepts described in the present invention apply to other optical fiber sizes known in the art. The inner cladding 430 and core 440 together form a dielectric waveguide for the propagation of light through optical fiber 101. Inner cladding 430, stress inducing cladding 420, and outer cladding 410 protect the light transmission area of optical fiber 101. Stress inducing cladding 420 induces birefringence in core 440, a difference in the propagation constant of light traveling through the fiber for two perpendicular polarizations. This birefringence breaks the circular symmetry in an optical fiber, creating two propagation axes within the fiber that are known as fast axis 450 and slow axis 460. Light polarized in the plane of fast axis 450 propagates at a higher velocity than light polarized in the plane of slow axis 460.

A second workstation 500, also referred to herein as a pigtailing station, is illustrated in FIG. 5. The second workstation 500 includes a bench 501, an alignment stage 510, an IOC stage 520, an IOC 530, and a glass block holder 120. Glass block holder 120 further includes a clamp strut 550, a clamp 560, a movable jaw 561, a fixed jaw 562, a hinge 568, a screw 565, a first ball foot 540, a second ball foot 541 and a micrometer screw 545. The IOC 530 further includes a first pigtail connection 531, a second pigtail connection 532, and a third pigtail connection 533. Each pigtail connection provides an optical port to and/or from the IOC. The bench 501 is a reference surface that supports elements of the second workstation 500. The bench 501 reference surface is defined by a plane that includes the y and z axes, and is perpendicular to the x axis (as shown). The IOC 530 is an integrated optical circuit and is described in detail in FIG. 7. First pigtail connection 531, the second pigtail connection 532, and the third pigtail connection on IOC 530 are locations where optical fiber leads connect to IOC 530. The IOC stage 520 is a support for IOC 530. IOC stage 520 is adjustable and allows a precise leveling of the top surface of IOC 530. The glass block holder 120 is a support for glass block 105. Movable jaw 561 and fixed jaw 562 form clamp 560 to secure glass block 105. The screw 565 is disposed within clamp 560 and is rotated to tighten or loosen the hold on glass block 105. The clamp 560 pivots about hinge 568. The clamp strut 550 is a support for the clamping mechanism and is disposed upon ball foot 540, ball foot 541, and micrometer screw 545, which further form a plane at an angle to alignment stage 510. Adjusting the micrometer screw 545 causes the plane to pivot about an axis, parallel to the z-axis, formed by a line that passes through the first ball foot 540 and the second ball foot 541.

The second workstation is calibrated (i.e., additional system alignment) by positioning a mirror block (fabricated to be the same size as the glass block 105 shown herein) in the glass block holder 120, at second workstation 500, on alignment stage 510 adjacent to IOC 530. The top surface of alignment stage 510, which is in contact with the ball foot 540, ball foot 541, and micrometer screw 545, is rotated until the AC 170 indicates that the top surface of the alignment stage 510 is parallel to the bench 501 reference surface. This calibration procedure is repeated for two other glass blocks and their respective glass block holders.

To transfer alignment from the first workstation 100, the glass block 105 and glass block holder 120 are removed from stage 122 at first workstation 100 and mounted on alignment stage 510 at second workstation 500. The IOC 530 is then adjusted until the AC 170 indicates that the top surface of IOC 530 is parallel to the bench 501 reference surface. When the IOC adjustment is complete, the fast axis of the IOC 530 is horizontal (i.e., parallel to the bench 501 reference surface), and the slow axis of the IOC 530 is vertical (i.e., perpendicular to the bench 501 reference surface), similar to the orientation of the calcite crystal 140 in the first workstation 100. Next, glass block 105 is positioned using adjustment stage 510 such that optical fiber 101 is aligned to first pigtail connection 531 of IOC 530. Stage 510 can move in the x, y and z directions, and can rotate about the x and y axes. The end of the optical fiber 101 not aligned with the pigtail connection 531 is illuminated with a light source, and optical power measurements are taken via the IOC 530 that assess the power transferred across the interface between the fiber 101 and the pigtail connection. These measurements show maximum values when the polarization axes of optical fiber 101 and IOC 530 are optimally aligned. Once a fiber orientation is found that produces a maximum power throughput, the Glass block 105 is permanently attached to IOC 530 by applying of a small amount of epoxy 590. The epoxy 590 is a is preferably a UV curable epoxy, such as Norlan 61, although other suitable adhesives may also be used to secure the glass block 105 to the IOC 530 in alternate embodiments of the invention. This procedure is then repeated to couple a second glass block 506 (not shown) to the second pigtail connection 532 and a third glass block 507 (not shown) to the third pigtail connection 533, so that an optical fiber lead is connected each of the three ports of IOC 530.

An alternate embodiment of second workstation 500, for connecting a first glass block 105, a second glass block 506, a third glass block 507 to the IOC 530, is shown in FIG. 6. This embodiment of the second workstation 500 includes a first dual axis goniometer 625, a second dual axis goniometer 626, a third dual axis goniometer 627. The second workstation further includes a first XYZ stage 615, a second XYZ stage 616, and a third XYZ stage 617. The IOC 530 includes a first pigtail connection 531, a second pigtail connection 532, and a third pigtail connection 533.

The dual axis goniometer 625 is a mount for glass block 105 that allows two degrees of rotational freedom. The dual axis goniometer 626 and the dual axis goniometer 627 are similar mounts for glass block 506 and glass block 507, respectively. The XYZ stage 615 is a mount for glass block 105 that allows three linear translational degrees of freedom. The XYZ stage 616 and the XYZ stage 617 are similar mounts for glass block 506 and glass block 507, respectively.

Dual axis goniometer 625 and XYZ stage 615 support glass block 105 as it is aligned to first pigtail connection 531. Dual axis goniometer 626 and XYZ stage 616 support glass block 506 as it is aligned to second pigtail connection 532. Dual axis goniometer 627 and XYZ stage 617 support glass block 507 as it is aligned to third pigtail connection 533. Each goniometer and XYZ stage combination thus combine to provide enough degrees of freedom to precisely align the polarization axes of the associated optical fiber 101 to the associated IOC 530 pigtail connection.

FIG. 7 is a perspective view of an IOC 530 that includes a substrate 710, a waveguide 750, first pigtail connection 531, second pigtail connection 532, third pigtail connection 533, a fast axis 720, and a slow axis 730. IOC 530 further includes a circuit constructed using miniaturized solid-state optical components on a semiconductor or dielectric substrate 710, e.g., Lithium Niobate (LiNbO3). However, the circuit is beyond the scope of the present invention, and is thus omitted from FIG. 7. IOC 530 serves to modulate, polarize, couple, and/or split light signals, depending upon the particular application for which it is used. Optical fibers 101 connect to first pigtail connection 531, the second pigtail connection 532, and the third pigtail connection 533.

Substrate 710 is preferably crystalline in nature, with its propagation axes oriented exactly along the crystalline axes of the device. The propagation axes of substrate 710 are straightforwardly ascertained with respect to the geometric features of IOC 530. Preferably, the IOC 530 is constructed so that the fast axis 720 is parallel to the top surface of IOC 530 and the slow axis 730 is perpendicular to the top surface of IOC 530, although other constructions with different axes orientations may also be used. With other axes orientations, the components of the workstations are arranged to accommodate the alternate orientations.

FIG. 8 shows a method 800 of aligning optical fiber 101 to a pigtail connection in IOC 530, according to one embodiment of the present invention, including the following steps:

Step 810: Aligning the Calcite to the Reference Surface of the White Light Interferometer Using the AC.

In this step, the operator uses AC 170 to align the crystal of calcite 140 to reference surface 102 of white light interferometer 150.

Step 820: Aligning Glass Block to Reference Surface

In this step, the operator uses AC 170 to align glass block 105 in glass block holder 120 to reference surface 102 of white light interferometer 150. This step is performed without optical fiber 101 in place. A tool is used to align a clamp used for holding the glass block 105 while optical fiber 101 is aligned to calcite 140.

Step 830: Transferring Glass Block to Second Workstation

In this step, the operator positions glass block 105 in second workstation 500 in front of IOC 530.

Step 840: Adjusting Alignment Stage Until Flat

In this step, the operator rotates alignment stage 510 until the surface where ball foot 540 and micrometer screw 545 contact alignment stage 510 is determined to be flat. Adjusting alignment stage 510 causes the output of AC 170 to change.

Step 850: Is there Another Glass Block to be Aligned?

In this decision step, the operator determines whether another glass block needs to be aligned. Glass blocks 105, 506, and 507 house the three pigtail leads to be connected to IOC 530. If yes, method 800 returns to step 810; if no, method 800 ends.

FIG. 9 shows a method 900 of transferring aligned optical fiber 101, including the following steps:

Step 910: Mounting Glass Block Holder with Glass Block on Interferometer Holder In this step, the operator mounts glass block holder 120 and glass block 105 to reference surface 102 in front of white light interferometer 150.

Step 920: Rotating Optical Fiber Until Minimum Interferometer Signal Achieved In this step, the operator rotates optical fiber 101 using fiber holder 110 until optical fiber 101 is aligned to the calcite polarization axes 149 by attaining a minimum signal from white light interferometer 150.

Step 930: Laying Fiber into Glass Block with About 2 mm Protruding

In this step, the operator lays optical fiber 101 into groove 310 of glass block 105 with about 2 millimeters of protruding fiber 117 exposed.

Step 940: Epoxying Optical Fiber into Glass Block

In this step, the operator epoxies optical fiber 101 into groove 310 in glass block 105.

Step 950: Removing Glass Block from Stage
In this step, the operator removes glass block 105 with optical fiber 101 from glass block holder 120.
Step 960: Polishing Protruding Optical Fiber Flat
In this step, the operator polishes protruding fiber 117 portion of optical fiber 101 until it is flush with the edge of glass block 105.
Step 970: Remounting Glass Block Onto Stage
In this step, the operator remounts glass block 105 in glass block holder 120.
Step 975: Using Micrometer to Get Minimum Interferometer Signal
In this step, the operator adjusts micrometer screw 545 to regain a minimum signal from white light interferometer 150.
Step 980: Removing Glass Block and Kinematic Stage from Interferometer Holder and Mounting At Second Workstation
In this step, the operator removes glass block 105 from reference surface 102 at first workstation 100 and mounts it in a clamp on the alignment stage 510 at second workstation 500.
Step 985: Leveling IOC Using Autocollimator
In this step, the operator uses AC 170 to level the top surface of IOC 530.
Step 990: Positioning and Epoxying Glass Block to IOC
In this step, the operator positions glass block 105 using alignment stage 510 such that optical fiber 101 is aligned to one of the pigtail inputs of IOC 530. The degrees of freedom that are adjusted in this step are X, Y, $\Theta_X$ and $\Theta_Y$, where $\Theta_X$ describes the angular rotation about he X axis, and $\Theta_Y$ describes the angular rotation about the Y axis (see FIG. 5 for definition of axes) Optical power measurements are taken, assessing the power through the connection interface. These measurements show a maximum when the polarization axes of optical fiber 101 and IOC 530 are optimally aligned. The operator then epoxies glass block 105 to IOC 530 such that it becomes a permanent element, adding support to the entering optical fiber 101.
Step 995: Is there Another Glass Block to Be Transferred?
In this decision step, the operator determines whether another glass block needs to be transferred. Glass blocks 105, 506, and 507 house the three pigtail leads to be connected to IOC 530, and each pigtail connection of IOC 530 connects to an associated pigtail lead. If yes, method 900 returns to step 910; if no, method 900 ends.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of aligning an optical fiber to an optical port of an integrated optical circuit, so as to maximize power throughput across an interface between the optical fiber and the integrated optical circuit, comprising:
   at a first workstation, positioning the optical fiber such that a fast axis of the optical fiber is oriented at a first angular position with respect to a first reference surface, and securing the optical fiber to a glass block while the fast axis of the optical fiber is oriented at the first angular position with respect to the first reference surface, wherein positioning the optical fiber includes:
   positioning a birefringent component on the first workstation such that a fast axis of the birefringent component is oriented at the first angular position with respect to the reference surface;
   positioning a light source at a second end of the optical fiber, and positioning the optical fiber such that a first end of the optical fiber directs a light beam through a first end of the birefringent component;
   positioning an interferometer at a second end of the birefringent component so as to receive the light beam, wherein the interferometer is configured to provide an optical path difference corresponding to a delay difference between a fast axis path and a slow axis path through the birefringent component;
   at a second workstation, positioning the integrated optical circuit such that a fast axis of the integrated optical circuit is oriented at the first angular position with respect to a second reference surface;
   positioning the glass block with the optical fiber at the second workstation such that the first end of the optical fiber is adjacent to the optical port of the integrated optical circuit and the fast axis of the optical fiber is oriented at the first angular position with respect to the second reference surface; and,
   illuminating the second end of the optical fiber at the second workstation, and rotating the optical fiber about a longitudinal axis of the optical fiber until the integrated optical circuit detects a maximum light power throughput across the interface between the optical fiber and the integrated optical circuit.

2. A method according to claim 1, wherein positioning the optical fiber further includes:
   rotating the optical fiber about the longitudinal axis of the optical fiber until the interferometer produces a minimum detector signal.

3. A method according to claim 2, wherein the birefringent component includes a calcite crystal.

4. A method according to claim 2, further including securing the birefringent component to a holder component.

5. A method according to claim 4, further including aligning the holder component at the first workstation via an autocollimator, so that the holder component maintains the birefringent component with the fast axis of the birefringent component oriented at the first angular position with respect to the first reference surface.

6. A method according to claim 4, wherein the holder component includes an adjusting mechanism for adjusting the position of the holder component with respect to the first reference surface.

7. A method of aligning an optical fiber to an optical port of an integrated optical circuit, so as to maximize power throughput across an interface between the optical fiber and the integrated optical circuit, comprising:
   at a first workstation, positioning the optical fiber such that a fast axis of the optical fiber is oriented at a first annular position with respect to a first reference surface, and securing the optical fiber to a glass block while the fast axis of the optical fiber is oriented at the first angular position with respect to the first reference surface;
   aligning the glass block at the first workstation via an autocollimator, so that the top surface of the glass block is parallel to the first reference surface;
   at a second workstation, positioning the integrated optical circuit such that a fast axis of the integrated optical circuit is oriented at the first annular position with respect to a second reference surface;
   positioning the glass block with the optical fiber at the second workstation such that a first end of the optical fiber is adjacent to the optical port of the integrated optical circuit and the fast axis of the optical fiber is oriented at the first angular position with respect to the second reference surface; and, illuminating a second end of the optical fiber at the second workstation, and rotating the optical fiber about a longitudinal axis of the optical fiber until the integrated optical circuit detects a maximum light power throughput across the interface between the optical fiber and the integrated optical circuit.

8. A method according to claim 1, further including securing the glass block in a block holder component.

9. A method according to claim 8, wherein the block holder component includes an adjusting mechanism for adjusting the position of the block holder component with respect to the first reference surface.

10. A method according to claim 1, wherein positioning the optical fiber further includes orienting the optical fiber such that the fast axis of the optical fiber is perpendicular to the first reference surface.

11. A method according to claim 1, wherein securing the optical fiber to the glass block further includes applying an adhesive to the optical fiber and the glass block.

12. A method according to claim 1, wherein securing the optical fiber to the glass block further includes applying an epoxy to the optical fiber and the glass block.

13. A method of aligning an optical fiber to an optical port of an integrated optical circuit, so as to maximize power throughput across an interface between the optical fiber and the integrated optical circuit, comprising:

at a first workstation, positioning the optical fiber such that a fast axis of the optical fiber is oriented at a first angular position with respect to a first reference surface, and securing the optical fiber to a glass block while the fast axis of the optical fiber is oriented at the first angular position with respect to the first reference surface;

at a second workstation, positioning the integrated optical circuit such that a fast axis of the integrated optical circuit is oriented at the first angular position with respect to a second reference surface, wherein positioning the integrated optical circuit includes aligning the integrated optical circuit at the second workstation via an autocollimator, so that the top surface of the integrated optical circuit is parallel to the second reference surface; positioning the glass block with the optical fiber at the second workstation such that a first end of the optical fiber is adjacent to the optical port of the integrated optical circuit and the fast axis of the optical fiber is oriented at the first angular position with respect to the second reference surface;

illuminating a second end of the optical fiber at the second workstation, and rotating the optical fiber about a longitudinal axis of the optical fiber until the integrated optical circuit detects a maximum light power throughput across the interface between the optical fiber and the integrated optical circuit.

14. A method of aligning an optical fiber to an optical port of an integrated optical circuit, so as to maximize power throughput across an interface between the optical fiber and the integrated optical circuit comprising:

at a first workstation, positioning the optical fiber such that a fast axis of the optical fiber is oriented at a first angular position with respect to a first reference surface, and securing the optical fiber to a glass block while the fast axis of the optical fiber is oriented at the first angular position with respect to the first reference surface;

at a second workstation, positioning the integrated optical circuit such that a fast axis of the integrated optical circuit is oriented at the first angular position with respect to a second reference surface;

positioning the glass block with the optical fiber at the second workstation such that a first end of the optical fiber is adjacent to the optical port of the integrated optical circuit and the fast axis of the optical fiber is oriented at the first angular position with respect to the second reference surface, wherein positioning the glass block with the optical fiber at the second workstation includes aligning the glass block at the second workstation via an autocollimator, so that the top surface of the glass block is parallel to the second reference surface;

illuminating a second end of the optical fiber at the second workstation, and rotating the optical fiber about a longitudinal axis of the optical fiber until the integrated optical circuit detects a maximum light power throughput across the interface between the optical fiber and the integrated optical circuit.

15. A method according to claim 1, further including fixedly attaching the optical fiber to the integrated optical circuit after aligning the optical fiber to the integrated optical circuit.

16. A method according to claim 1, further including applying an adhesive to the optical fiber and the integrated optical circuit, so as to fixedly attach the optical fiber to the integrated optical circuit.

17. A method according to claim 1, further including applying an epoxy to the optical fiber and the integrated optical circuit, so as to fixedly attach the optical fiber to the integrated optical circuit.

18. A method of aligning an optical fiber to an optical port of an integrated optical circuit, so as to maximize the power throughput across an interface between the optical fiber and the integrated optical circuit, comprising:

at a first workstation, positioning the optical fiber such that a slow axis of the optical fiber is oriented at a first angular position with respect to a first reference surface, and securing the optical fiber to a glass block while the slow axis of the optical fiber is oriented at the first angular position with respect to the first reference surface, wherein positioning the optical fiber includes:

positioning a birefringent component on the first workstation such that a slow axis of the birefringent component is oriented at the first angular position with respect to the reference surface;

positioning a light source at a second end of the optical fiber, and positioning the optical fiber such that a first end of the optical fiber directs a light beam through a first end of the birefringent component;

positioning an interferometer at a second end of the birefringent component so as to receive the light beam, wherein the interferometer is configured to provide an optical path delay corresponding to a delay difference between a fast axis path and a slow axis path through the birefringent component;

at a second workstation, positioning the integrated optical circuit such that a slow axis of the integrated optical circuit is oriented at the first angular position with respect to a second reference surface;

positioning the glass block with the optical fiber at the second workstation such that the first end of the optical fiber is adjacent to the optical port of the integrated optical circuit and the slow axis of the optical fiber is oriented at the first angular position with respect to the second reference surface; and, illuminating the second end of the optical fiber at the second workstation, and rotating the optical fiber about a longitudinal axis of the optical fiber until the integrated optical circuit detects a maximum light power throughput across the interface between the optical fiber and the integrated optical circuit.

19. A method according to claim 18, wherein positioning the optical fiber further includes:

rotating the optical fiber about the longitudinal axis of the optical fiber until the interferometer produces a minimum detector signal.

20. A method according to claim 19, wherein the birefringent component includes a calcite crystal.

21. A system for alignment of an optical fiber to an optical port of an integrated circuit, so as to maximize power throughput across an interface between the optical fiber and the integrated optical circuit, comprising:

a first workstation for positioning the optical fiber such that a fast axis of the optical fiber is oriented at a first angular position with respect to a first reference surface, and for securing the optical fiber to a glass block while the fast axis of the optical fiber is oriented at the first angular position with respect to the first reference surface;

wherein the first workstation comprises a birefringent component, adjustably attached to the first reference surface, for receiving a light beam emanating from the optical fiber and an interferometer, fixedly attached to the first reference surface, for receiving the light beam that traverses and emanates from the birefringent component;

a second workstation for positioning the integrated optical circuit such that a fast axis of the integrated optical circuit is oriented at the first angular position with respect to a second reference surface;

wherein the glass block with the optical fiber is transferred from the first workstation to the second workstation such that a first end of the optical fiber is adjacent to the optical port of the integrated optical circuit and the fast axis of the optical fiber is oriented at the first angular position with respect to the second reference surface, and while the second end of the optical fiber is illuminated, the optical fiber is rotated about a longitudinal axis of the optical fiber until the integrated optical circuit detects a maximum light power throughput across the interface between the optical fiber and the integrated optical circuit.

22. A system according to claim 21, further including a glass block holder, adjustably attached to the first reference surface, for holding the glass block at the first angular position with respect to the first reference surface.

23. A system according to claim 21, wherein the first workstation includes:

(i) the first reference surface;

(ii) the glass block, adjustably attached to the first reference surface.

24. A system according to claim 23, further including an autocollimator for determining a position of the glass block and a position of the birefringent component, each with respect to the first reference surface.

25. A system according to claim 23, further including a birefringent component holder for holding the birefringent component at the first angular position with respect to the first reference surface.

26. A system according to claim 25, wherein the birefringent component holder includes an adjusting mechanism for varying a position of the birefringent component holder with respect to the first reference surface.

27. A system according to claim 26, wherein the adjusting mechanism includes a shim disposed between the birefringent component holder and the first reference surface.

28. A system according to claim 23, wherein the birefringent component includes a calcite crystal.

29. A system according to claim 23, further including a glass block holder for holding the glass block at the first angular position with respect to the first reference surface.

30. A system according to claim 29, wherein the glass block holder includes an adjusting mechanism for varying a position of the glass block holder with respect to the first reference surface.

31. A system according to claim 30, wherein the adjusting mechanism includes a micrometer screw.

32. A system according to claim 23, wherein the interferometer is configured to provide an optical path difference corresponding to a delay difference between a fast axis path and a slow axis path through the birefringent component.

33. A system according to claim 23, wherein the interferometer is configured to produce a minimum output signal when the fast axis of the optical fiber is aligned with the fast axis of the birefringent component.

34. A system according to claim 21, wherein the second workstation includes:

(i) the second reference surface;

(ii) an integrated optical circuit removably attached to the second reference surface;

(iii) an additional glass block holder, adjustably attached to the second reference surface, for holding the glass block such that the first end of the optical fiber is adjacent to the optical port of the integrated optical circuit, and the fast axis of the optical fiber is oriented at the first angular position with respect to the second reference surface.

35. A system according to claim 34, wherein the additional glass block holder includes a micrometer screw for varying a position of the glass block holder with respect to the second reference surface.

36. A system according to claim 34, wherein the additional glass block holder includes a clamp for removably securing the glass block.

37. A system according to claim 34, further including an integrated optical circuit stage for supporting the integrated optical circuit, wherein the integrated optical circuit stage is adjustably attached to the reference surface so as to selectably vary a position of the integrated optical circuit.

38. A system for aligning an optical fiber to an optical port of an integrated circuit, so as to maximize power throughput across an interface between the optical fiber and the integrated optical circuit, comprising:

a first workstation for positioning the optical fiber such that a fast axis of the optical fiber is oriented at a first angular position with respect to a first reference surface, and for securing the optical fiber to a glass block while the fast axis of the optical fiber is oriented at the first angular position with respect to the first reference surface, the first workstation including (i) the first reference surface, (ii) the glass block, adjustably attached to the first reference surface, (ii) a birefringent component, adjustably attached to the first reference surface, for receiving a light beam emanating from the optical fiber, and (iii) an interferometer, fixedly attached to the first reference surface, for receiving the light beam that traverses and emanates from the birefringent component;

a second workstation for positioning the integrated optical circuit such that a fast axis of the integrated optical circuit is oriented at the first angular position with respect to a second reference surface, including (i) the second reference surface, (ii) an integrated optical circuit removably attached to the second reference surface, and (iii) an additional glass block holder, adjustably attached to the second reference surface, for holding the glass block such that the first end of the optical fiber is adjacent to the optical port of the integrated optical circuit, and the fast axis of the optical fiber is oriented at the first angular position with respect to the second reference surface;

wherein the glass block with the optical fiber is transferred from the first workstation to the second workstation such that a first end of the optical fiber is adjacent to the optical port of the integrated optical circuit and the fast axis of the optical fiber is oriented at the first angular position with respect to the second reference surface, and while the second end of the optical fiber is illuminated, the optical fiber is rotated about a longitudinal axis of the optical fiber until the integrated optical circuit detects a maximum light power throughput across the interface between the optical fiber and the integrated optical circuit.

39. A system for aligning an optical fiber to an optical port of an integrated circuit, so as to maximize power throughput across an interface between the optical fiber and the integrated optical circuit, comprising:

first means for positioning the optical fiber such that a fast axis of the optical fiber is oriented at a first angular position with respect to a first reference surface, and for securing the optical fiber to a glass block while the fast axis of the optical fiber is oriented at the first angular position with respect to the first reference surface;

second means for positioning the integrated optical circuit such that a fast axis of the integrated optical circuit is oriented at the first angular position with respect to a second reference surface;

wherein the first means comprises:
means for positioning a birefringent component on the first workstation such that a fast axis of the birefringent component is oriented at the first angular position with respect to the reference surface;
means for positioning a light source at a second end of the optical fiber, and for positioning the optical fiber such that a first end of the optical fiber directs a light beam through a first end of the birefringent component;
means for positioning an interferometer at a second end of the birefringent component so as to receive the light beam, wherein the interferometer is configured to provide an optical path difference corresponding to a delay difference between a fast axis path and a slow axis path through the birefringent component;

wherein the glass block with the optical fiber is transferred from the first means for positioning the optical fiber to the second means for positioning the optical fiber, such that the first end of the optical fiber is adjacent to the optical port of the integrated optical circuit and the fast axis of the optical fiber is oriented at the first angular position with respect to the second reference surface, and while the second end of the optical fiber is illuminated, the optical fiber is rotated about a longitudinal axis of the optical fiber until the integrated optical circuit detects a maximum light power throughput across the interface between the optical fiber and the integrated optical circuit.

40. A method of aligning an optical fiber to an optical port of an integrated optical circuit, so as to maximize power throughput across an interface between the optical fiber and the integrated optical circuit, comprising:

at a first workstation, positioning the optical fiber such that a fast axis of the optical fiber is oriented at a first angular position with respect to a first reference surface, and securing the optical fiber to a glass block while the fast axis of the optical fiber is oriented at the first angular position with respect to the first reference surface, positioning the optical fiber further including:
(i) positioning a birefringent component on the first workstation such that a fast axis of the birefringent component is oriented at the first angular position with respect to the reference surface; (ii) positioning a light source at second end of the optical fiber, and positioning the optical fiber such that the first end of the optical fiber directs a light beam through a first end of the birefringent component; (iii) positioning an interferometer at a second end of the birefringent component so as to receive the light beam, wherein the interferometer is configured to provide an optical path difference corresponding to a delay difference between a fast axis path and a slow axis path through the birefringent component; and, (iv) rotating the optical fiber about the longitudinal axis of the optical fiber until the interferometer produces a minimum detector signal;

at a second workstation, positioning the integrated optical circuit such that a fast axis of the integrated optical circuit is oriented at the first angular position with respect to a second reference surface;

positioning the glass block with the optical fiber at the second workstation such that a first end of the optical fiber is adjacent to the optical port of the integrated optical circuit and the fast axis of the optical fiber is oriented at the first angular position with respect to the second reference surface; and, illuminating a second end of the optical fiber at the second workstation, and rotating the optical fiber about a longitudinal axis of the optical fiber until the integrated optical circuit detects a maximum light power throughput across the interface between the optical fiber and the integrated optical circuit.

41. A method of aligning an optical fiber to an optical port of an integrated optical circuit, so as to maximize power throughput across an interface between the optical fiber and the integrated optical circuit, comprising:

positioning the optical fiber such that a polarization axis of the optical fiber is oriented at a first angular position with respect to a first reference surface, and securing the optical fiber to a glass block while the polarization axis of the optical fiber is oriented at the first angular position with respect to the first reference surface, wherein positioning the optical fiber includes:
positioning a birefringent component on the first workstation such that a polarization axis of the birefringent component is oriented at the first angular position with respect to the reference surface;
positioning a light source at a second end of the optical fiber, and positioning the optical fiber such that a first end of the optical fiber directs a light beam through a first end of the birefringent component;
positioning an interferometer at a second end of the birefringent component so as to receive the light beam, wherein the interferometer is configured to provide an optical path difference corresponding to a delay difference between a fast axis path and a slow axis path through the birefringent component;

positioning the integrated optical circuit such that a polarization axis of the integrated optical circuit is oriented at the first angular position with respect to a second reference surface;

positioning the glass block with the optical fiber at the second workstation such that the first end of the optical fiber is adjacent to the optical port of the integrated optical circuit and the polarization axis of the optical fiber is oriented at the first angular position with respect to the second reference surface; and, illuminating the second end of the optical fiber at the second workstation, and rotating the optical fiber about a longitudinal axis of the optical fiber until the integrated optical circuit detects a maximum light power throughput across the interface between the optical fiber and the integrated optical circuit.

42. A method according to claim 41, wherein positioning the optical fiber further includes:

rotating the optical fiber about the longitudinal axis of the optical fiber until the interferometer produces a minimum detector signal.

43. A method according to claim 41, wherein the polarization axis includes a fast axis.

44. A method according to claim 41, wherein the polarization axis includes a slow axis.

45. A system for aligning an optical fiber to an optical port of an integrated circuit, so as to maximize power throughput across an interface between the optical fiber and the integrated optical circuit, comprising:

a first workstation for positioning the optical fiber such that a polarization axis of the optical fiber is oriented at a first angular position with respect to a first reference surface, and for securing the optical fiber to a glass block while the fast axis of the optical fiber is oriented at the first angular position with respect to the first reference surface;

a second workstation for positioning the integrated optical circuit such that a polarization axis of the integrated optical circuit is oriented at the first angular position with respect to a second reference surface;

wherein the first workstation comprises: (i) the first reference surface, (ii) the glass block, adjustably attached to the first reference surface, (iii) a birefringent component, adjustably attached to the first reference surface, for receiving a light beam emanating from the optical fiber, and (iv) an interferometer, fixedly attached to the first reference surface, for receiving the light beam that traverses and emanates from the birefringent component;

wherein the glass block with the optical fiber is transferred from the first workstation to the second workstation such that a first end of the optical fiber is adjacent to the optical port of the integrated optical circuit and the polarization axis of the optical fiber is oriented at the first angular position with respect to the second reference surface, and while the second end of the optical fiber is illuminated, the optical fiber is rotated about a longitudinal axis of the optical fiber until the integrated optical circuit detects a maximum light power throughput across the interface between the optical fiber and the integrated optical circuit.

46. A system according to claim 45, wherein the polarization axis includes a fast axis.

47. A system according to claim 45, wherein the polarization axis includes a slow axis.

48. A method according to claim 1, further including aligning the glass block at the first workstation via an autocollimator, so that the top surface of the glass block is parallel to the first reference surface.

49. A method according to claim 1, wherein positioning the integrated optical circuit further includes aligning the integrated optical circuit at the second workstation via an autocollimator, so that the top surface of the integrated optical circuit is parallel to the second reference surface.

50. A method according to claim 1, wherein positioning the glass block with the optical fiber at the second workstation further includes aligning the glass block at the second workstation via an autocollimator, so that the top surface of the glass block is parallel to the second reference surface.

* * * * *